(12) United States Patent
Zeng

(10) Patent No.: US 10,078,179 B2
(45) Date of Patent: Sep. 18, 2018

(54) BACKLIGHT MODULE AND PLASTIC FRAME STRUCTURE THEREOF

(71) Applicant: WUHAN CHINA STAR OPTOELECTRONICS TECHNOLOGY CO., LTD., Wuhan (CN)

(72) Inventor: Jie Zeng, Wuhan (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 14/905,843

(22) PCT Filed: Dec. 23, 2015

(86) PCT No.: PCT/CN2015/098408
§ 371 (c)(1),
(2) Date: Jan. 18, 2016

(87) PCT Pub. No.: WO2017/063270
PCT Pub. Date: Apr. 20, 2017

(65) Prior Publication Data
US 2018/0210128 A1 Jul. 26, 2018

(30) Foreign Application Priority Data
Oct. 12, 2015 (CN) .......................... 2015 1 0654854

(51) Int. Cl.
*F21V 7/04* (2006.01)
*F21V 8/00* (2006.01)

(52) U.S. Cl.
CPC ........... *G02B 6/009* (2013.01); *G02B 6/0091* (2013.01)

(58) Field of Classification Search
CPC .. G02B 6/0081; G02B 6/0083; G02B 6/0086; G02B 6/009; G02B 6/0091
USPC ......................................... 362/612, 630–634
See application file for complete search history.

(56) References Cited

U.S. PATENT DOCUMENTS 7,441,938 B2 * 10/2008 Sakai ................... G02B 6/0068
362/612

* cited by examiner

*Primary Examiner* — Jason Moon Han
(74) *Attorney, Agent, or Firm* — Mark M. Friedman

(57) ABSTRACT

A backlight module and a plastic frame structure thereof are provided. The plastic frame structure mainly comprises a plastic frame body and a light source carrier. The plastic frame body is used to carry optical films such as a light guide plate, and the light source carrier is used to fix light sources. The two parts, i.e. the plastic frame body and the light source carrier, are connected with each other by a detachable means, so as to be conveniently tested respectively, and then assembled together when no defect is found, as so to increase the assembling efficiency. Furthermore, if the two parts are assembled but have defects found, the two parts can conveniently be changed, respectively. Therefore, not only the rework cost can be reduced, but also the efficiencies of the test and assembly for the whole of the backlight module are increased.

13 Claims, 4 Drawing Sheets

BACKLIGHT MODULE AND PLASTIC FRAME STRUCTURE THEREOF

FIELD OF THE INVENTION

The present invention relates to a backlight module and a plastic frame structure thereof, and more particularly to a plastic frame structure having a detachable-type design and a backlight module comprising the plastic frame structure.

BACKGROUND OF THE INVENTION

Nowadays, liquid crystal display (LCD) panels are widely applied to various electronic products with growth potential, such as monitors, notebook computers, digital cameras, and projectors. After manufacturers of LCD panels fabricate glass substrates, a color filter is firstly combined with the glass substrates, then liquid crystals are filled into the sealed glass substrates and the color filter, and further combined with various components, including a backlight module, driver ICs, controller PCBs, etc., to commonly construct a LCD module for selling to downstream manufacturers of notebook computers or LCD monitors.

The backlight module is one of the key components of LCD panels. Because the liquid crystals cannot emit light by themselves, the function of the backlight module is to provide evenly distributed light sources with sufficient brightness for normally showing images. The backlight module comprises various components, such as light sources, a lamp shade, a reflector plate, a light guide plate, a diffusion sheet, a brightness enhancement film, and an outer frame.

Refer now to FIG. 1, which is a cross-sectional view of a traditional backlight module. A traditional backlight module 90 comprises a plastic frame 91, a reflector 92, a light guide plate 93, an optical film assembly 94, a light source circuit board 95, and a plurality of point light sources 96 installed on the light source circuit board. In actual installation, there are still some problems existing in the traditional backlight module 90, as follows: when in assembling, the plastic frame 91 must install a light guide plate element and light sources in order, wherein the installing step of the light guide plate element comprises installing the reflector 92 in order, the light guide plate 93, and the optical film assembly 94 into the center of the plastic frame 91; and the installing step of the light sources comprises reversely installing the light source circuit board 95 having the point light sources 96 between a side edge of the plastic frame 91 and the light guide plate 93. Finally, light shading tapes (not shown) are used to fix the light source circuit board 95 on the surfaces of the side edge of the plastic frame 91 and the light guide plate 93 simultaneously. Thus, the point light sources 96 on the light source circuit board 95 can emit the lights toward the light guide plate 93.

However, when the above-mentioned assembling of the light sources and the light guide plate element is finished, a test is necessary to be processed. If anyone of the light sources or the light guide plate element is found to be defective, an additional test to find which parts the defect is from is necessary, so as to change the defective parts. However, the plastic frame installed with the light sources and the light guide plate element is a one-piece design, and the light source circuit board 95 is simultaneously fixed on the side edge of the plastic frame 91 and the light guide plate 93, so that in a repair and rework after the above-mentioned finding of the defective parts, the backlight module must be entirely disassembled to process the related test, parts changing, and reassembling operation. Therefore, this way not only lowers the efficiency, but also may cause the other normal parts to be damaged during the repeated disassembling and assembling processes.

Hence, it is necessary to provide a backlight module and a plastic frame structure thereof which solve the problems existing in the conventional technologies.

SUMMARY OF THE INVENTION

The object of the present invention is to provide a plastic frame structure of a backlight module, and the plastic frame structure is a detachable-type design, which can increase the efficiencies of the test and assembly for the whole of the backlight module.

To achieve the above object, the present invention provides a plastic frame structure of a backlight module, which comprises:

a plastic frame body being a rectangular hollow frame and having at least one light source side edge, wherein a plurality of light source openings are formed along a length direction of the light source side edge; and at least one light source carrier having an assembling side edge correspondingly assembled onto the light source side edge of the plastic frame body, wherein a plurality of light source receiving grooves are formed corresponding to the light source openings; a light source circuit board is installed on the light source carrier; and a plurality of light sources of the light source circuit board are respectively placed into the light source receiving grooves, and emit lights toward an inside of the plastic frame structure through the light source openings;

wherein the assembling side edge is correspondingly assembled onto the light source side edge of the plastic frame body by way of engagement; and the light source circuit board is reversely adhered on an upper surface of the light source carrier, so that the light sources are respectively placed into the light source receiving grooves of the light source carrier.

In one embodiment of the present invention, two ends of the light source side edge of the plastic frame body are respectively provided with a first engaging portion; two ends of the assembling side edge of the light source carrier are respectively and correspondingly provided with a second engaging portion; and the first engaging portion is engaged with the second engaging portion.

In one embodiment of the present invention, a central portion of the light source side edge of the plastic frame body is provided with a third engaging portion; a central portion of the assembling side edge of the light source carrier is correspondingly provided with a fourth engaging portion; and the third engaging portion is engaged with the fourth engaging portion.

To achieve the above object, the present invention further provides a plastic frame structure of a backlight module, which comprises:

a plastic frame body being a rectangular hollow frame and having at least one light source side edge, wherein a plurality of light source openings are formed along a length direction of the light source side edge; and at least one light source carrier having an assembling side edge correspondingly assembled onto the light source side edge of the plastic frame body, wherein a plurality of light source receiving grooves are formed corresponding to the light source openings; a light source circuit board is installed on the light source carrier; and a plurality of light sources of the light source circuit board are respectively placed into the light source receiving grooves, and emit lights toward an inside of the plastic frame structure through the light source openings.

In one embodiment of the present invention, the assembling side edge is correspondingly assembled onto the light source side edge of the plastic frame body by way of engagement.

In one embodiment of the present invention, two ends of the light source side edge of the plastic frame body are respectively provided with a first engaging portion; two ends of the assembling side edge of the light source carrier are respectively and correspondingly provided with a second engaging portion; and the first engaging portion is engaged with the second engaging portion.

In one embodiment of the present invention, a central portion of the light source side edge of the plastic frame body is provided with a third engaging portion; a central portion of the assembling side edge of the light source carrier is correspondingly provided with a fourth engaging portion; and the third engaging portion is engaged with the fourth engaging portion.

In one embodiment of the present invention, the light source circuit board is reversely adhered on an upper surface of the light source carrier, so that the light sources are respectively placed into the light source receiving grooves of the light source carrier.

To achieve the above object, the present invention further provides a backlight module, which comprises:

a plastic frame structure, comprising:

a plastic frame body being a rectangular hollow frame and having at least one light source side edge, wherein a plurality of light source openings are formed along a length direction of the light source side edge; and at least one light source carrier having an assembling side edge correspondingly assembled onto the light source side edge of the plastic frame body, wherein a plurality of light source receiving grooves are formed corresponding to the light source openings;

a light guide plate installed into the plastic frame body;

an optical film assembly installed on the light guide plate; and a light source circuit board having a plurality of light sources and installed on the light source carrier, wherein the light sources are respectively placed into the light source receiving grooves of the light source carrier, and emit lights toward the light guide plate inside the plastic frame body through the light source openings;

wherein the plastic frame body, the light guide plate, and the optical film assembly are commonly formed as a first assembling body; the light source carrier and the light source circuit board are commonly formed as a second assembling body; and the first assembling body and the second assembling body are a detachably assembled with each other.

In one embodiment of the present invention, the assembling side edge is correspondingly assembled onto the light source side edge of the plastic frame body by way of engagement.

In one embodiment of the present invention, two ends of the light source side edge of the plastic frame body are respectively provided with a first engaging portion; two ends of the assembling side edge of the light source carrier are respectively and correspondingly provided with a second engaging portion; and the first engaging portion is engaged with the second engaging portion.

In one embodiment of the present invention, a central portion of the light source side edge of the plastic frame body is provided with a third engaging portion; a central portion of the assembling side edge of the light source carrier is correspondingly provided with a fourth engaging portion; and the third engaging portion is engaged with the fourth engaging portion.

In one embodiment of the present invention, the light source circuit board is reversely adhered on an upper surface of the light source carrier, so that the light sources are respectively placed into the light source receiving grooves of the light source carrier.

DETAILED DESCRIPTION OF THE PREFERRED EMBODIMENTS

Figure 1:
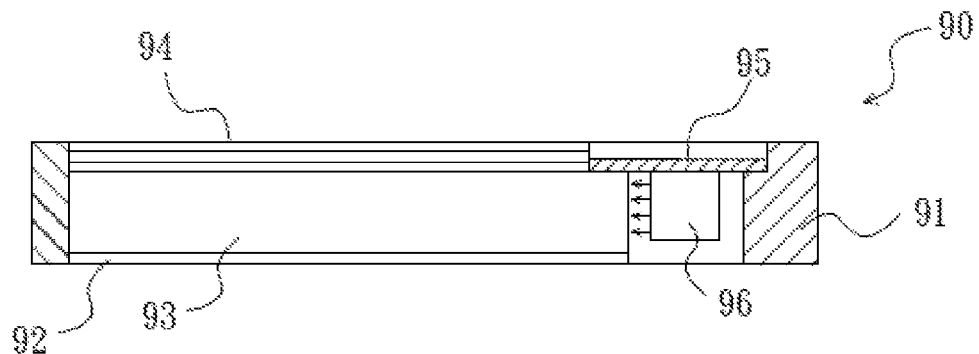
FIG. 1 is a cross-sectional view of a traditional backlight module.

The foregoing objects, features, and advantages adopted by the present invention can be best understood by referring to the following detailed description of the preferred embodiments and the accompanying drawings. Furthermore, the directional terms described in the present invention, such as upper, lower, front, rear, left, right, inside, outer, side, etc., are only directions with reference to the accompanying drawings, so that the used directional terms are used to describe and understand the present invention, but the present invention is not limited thereto. In the drawings, units with similar structures use the same numerals.

Figure 2:
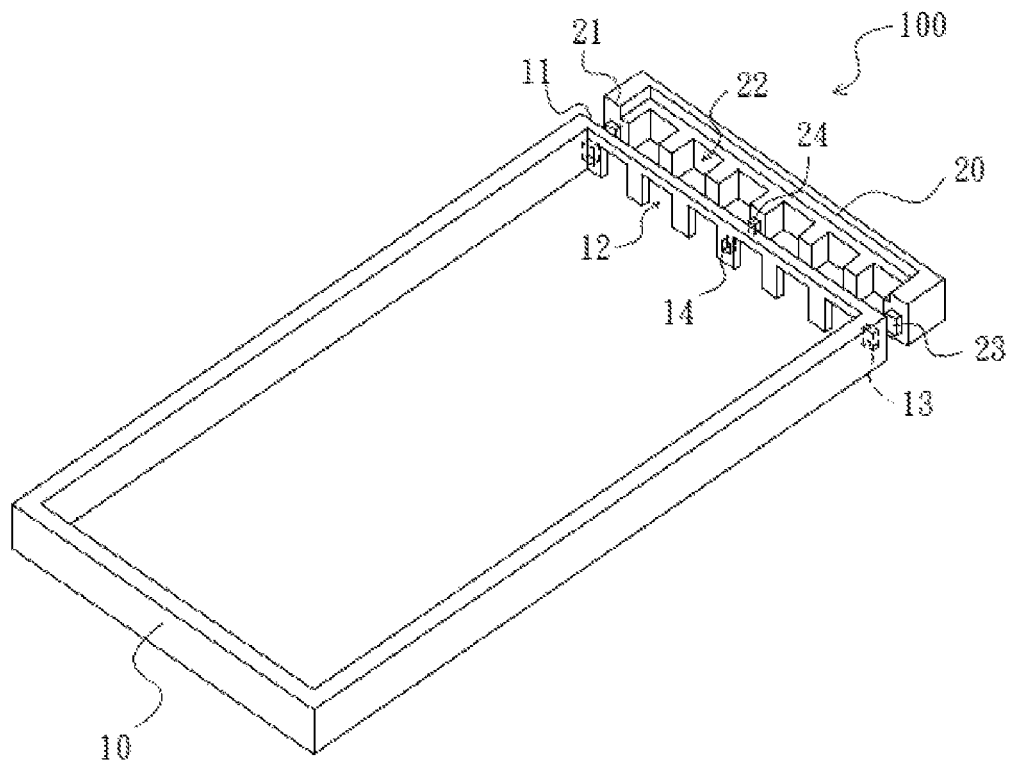
FIG. 2 is a disassembled perspective view of a plastic frame structure of a backlight module according to a preferred embodiment of the present invention.
Figure 3:
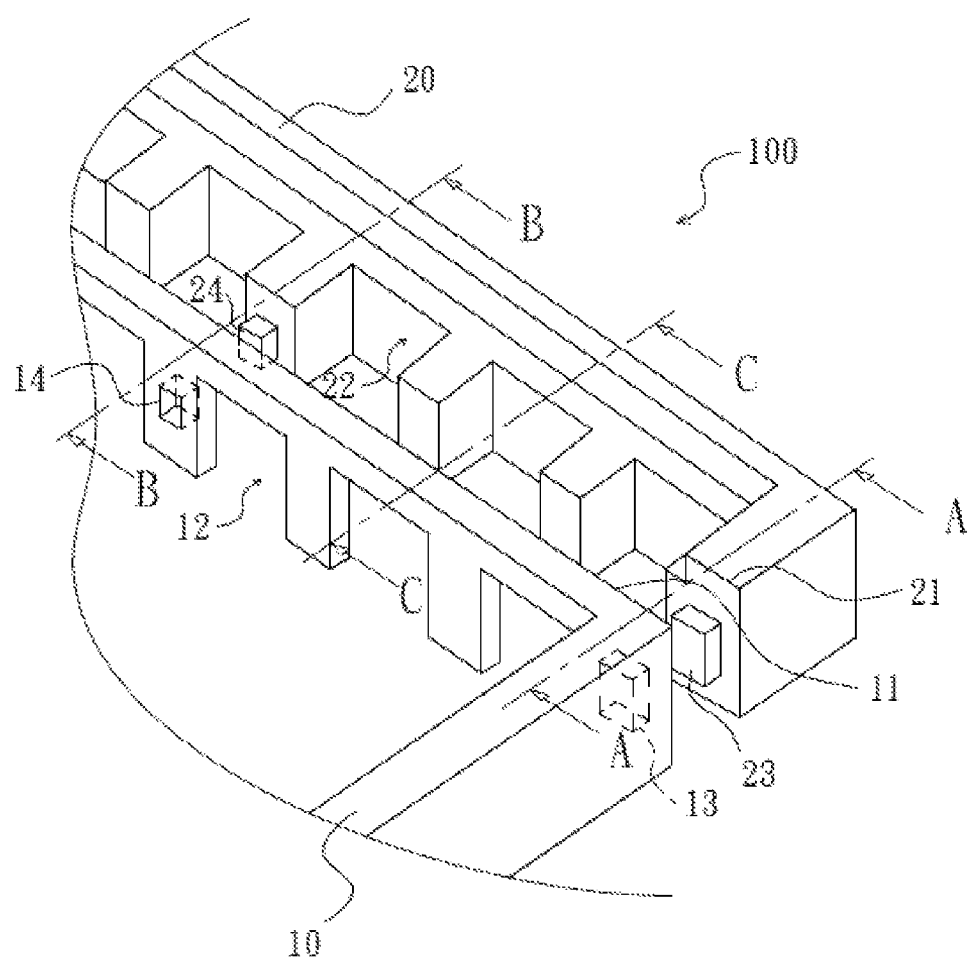
FIG. 3 is a partial enlarged view of FIG. 2.

Refer now to FIGS. 2 and 3, wherein FIG. 2 is a disassembled perspective view of a plastic frame structure of a backlight module according to the present invention; and FIG. 3 is a partial enlarged view of FIG. 2. A plastic frame structure 100 of a backlight module according to the present invention mainly comprises: a plastic frame body 10 and at least one light source carrier 20. The plastic frame body 10 is a rectangular hollow frame, wherein the hollow portion is used to carry and install a light guide plate element (not shown), and at least one of four side edges of the frame is a light source side edge 11, and a plurality of light source openings 12 are formed along a length direction of the light source side edge 11.

Furthermore, as shown in FIGS. 2 and 3, the at least one light source carrier 20 has an assembling side edge 21, by which the light source carrier 20 can be correspondingly assembled onto the light source side edge 11 of the plastic frame body 10. Additionally, a plurality of light source receiving grooves 22 are formed on the light source carrier 20 and correspond to the light source openings 12, so that a plurality of light sources (not shown) will be respectively placed into the light source receiving grooves 22 in a later assembling process, and emit lights toward the inside of the plastic frame structure 100 (namely a position of the light guide plate).

Furthermore, as shown in FIGS. 2 and 3, the shape of the light source openings 12 is an open notch, namely a groove/hole with an open bottom, and this is a shape which can be conveniently manufactured. However, in other possible embodiments of the present invention, the shape of the light source openings 12 can be other closing or opening geometric figures, and the specific shape thereof is not limited in the present invention as long as it can allow the light sources which are in the light source receiving grooves 22 to pass through.

Figure 4:
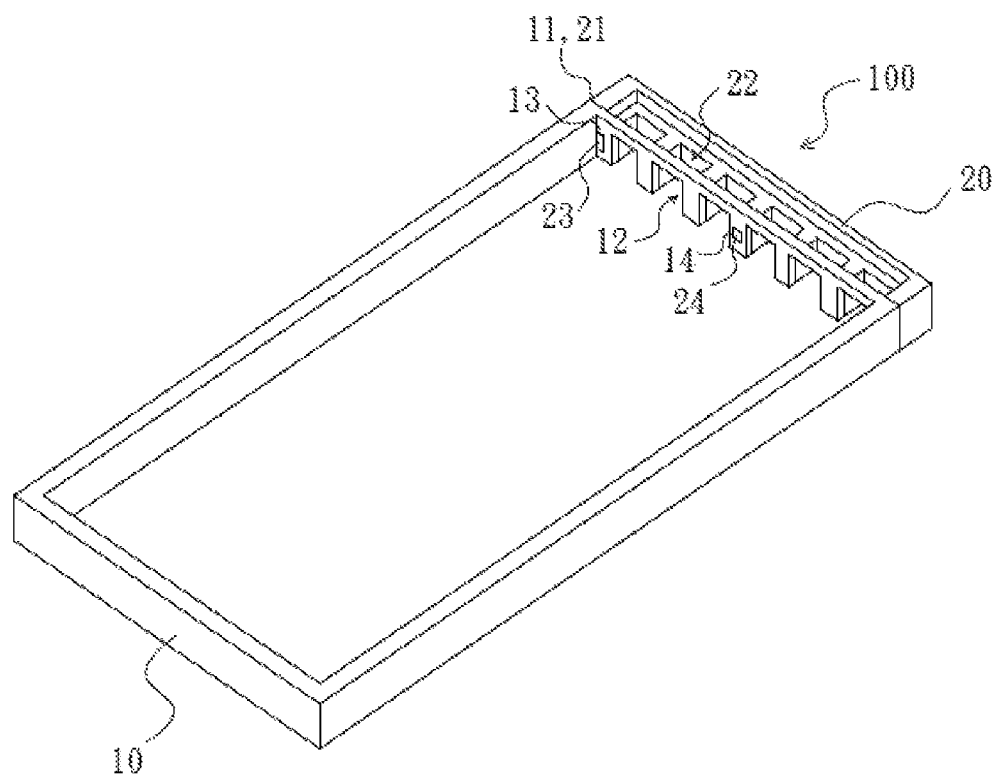
FIG. 4 is an assembled perspective view of the plastic frame structure of the backlight module according to a preferred embodiment of the present invention.

Refer now to FIG. 4, which is an assembled perspective view of the plastic frame structure of the backlight module according to a preferred embodiment of the present invention. A design feature of the plastic frame structure 100 of the backlight module according to the present invention is: the plastic frame structure 100 is a detachable-type design (as shown in FIG. 2). That is, the plastic frame structure 100 comprises the plastic frame body 10 and the light source carrier 20, wherein the plastic frame body 10 is used to carry and install the light guide plate element, and the light source carrier 20 is used to carry and install the light sources. Next, a complete plastic frame structure 100 of the backlight module is formed by combining the plastic frame body 10 and the light source carrier 20.

Furthermore, an assembling method for the light source side edge 11 of the plastic frame body 10 and the assembling side edge 21 of the light source carrier 20 is by way of adherence, screw, or engagement, but in principle they are not limited in the present invention. However, the preferable assembling method for the plastic frame structure 100 of the present invention is to adopt the engagement structure which has a convenience of assembly and disassembly. The example is described as follows.

Figure 5:
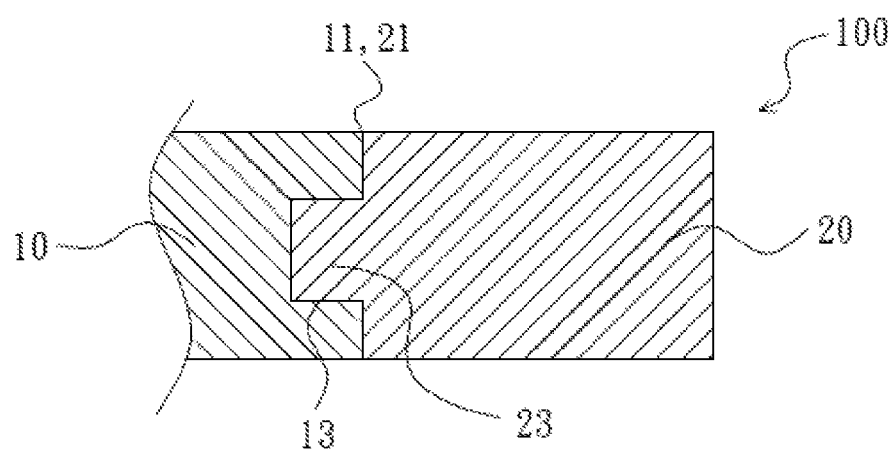
FIG. 5 is a cross-sectional view of FIG. 3 along an A-A sectional diction, and shows a plastic frame body and a light source carrier of the present invention after being assembled.

Refer now to FIGS. 3, 4, and 5, wherein FIG. 5 is a cross-sectional view of FIG. 3 along an A-A sectional diction, and shows the plastic frame body and the light source carrier of the present invention after being assembled. The light source side edge 11 of the plastic frame body 10 is provided with a plurality of first engaging portions 13, and the assembling side edge 21 of the light source carrier 20 is correspondingly provided with a plurality of second engaging portions 23. When the plurality of first engaging portions 13 are engaged with the plurality of second engaging portions 23, the light source carrier 20 is engaged with the plastic frame body 10 (as shown in FIG. 4). In the embodiment, although the plastic frame body 10 is provided with one of the first engaging portions 13 on each of the two end portions of the light source side edge 11 respectively, the specific number and position of the first engaging portions 13 and the second engaging portions 23 are not limited in the present invention. Additionally, although in the embodiment the first engaging portion 13 is a square hole and the second engaging portions 23 is correspondingly a square pillar, forming as a simple engagement, but the specific engaging shapes of the first engaging portions 13 and the second engaging portions 23 are also not limited in the present invention, so that any shape or structure which can only engage with each other and can easily be separated can be adopted.

Figure 6:
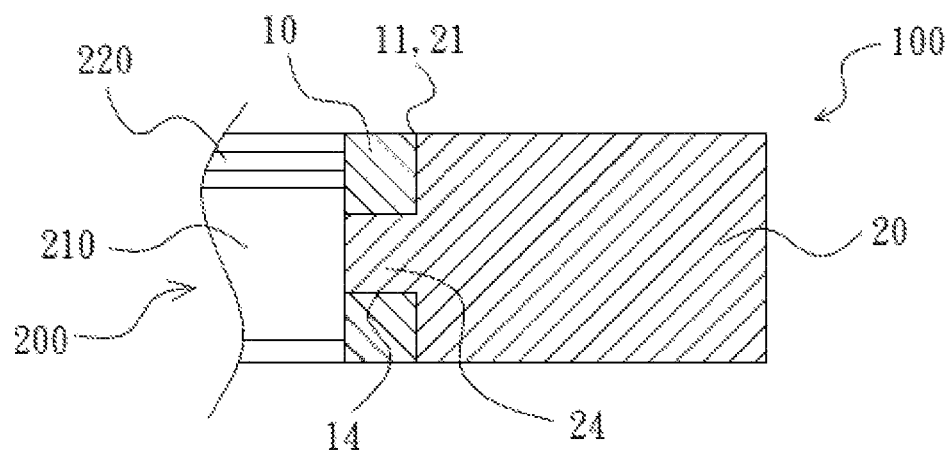
FIG. 6 is a cross-sectional view of FIG. 3 along a B-B sectional diction, and shows the plastic frame body and the light source carrier of the present invention after being assembled.

Refer now to FIGS. 3, 4, and 6, wherein FIG. 6 is a cross-sectional view of FIG. 3 along a B-B sectional diction, and shows the plastic frame body and the light source carrier of the present invention after being assembled. To consider an engaging strength which is in a middle portion of the light source side edge 11 of the plastic frame body 10 and the assembling side edge 21 of the light source carrier 20, a central portion of the light source side edge 11 of the plastic frame body 10 is provided with at least one third engaging portions 14, and a central portion of the assembling side edge 21 of the light source carrier 20 is correspondingly provided with at least one fourth engaging portions 24. The third engaging portions 14 is engaged with the fourth engaging portions 24, so that the engagement between the light source carrier 20 and the plastic frame body 10 is more stable (as shown in FIG. 4). However, the specific number and position of the third engaging portions 14 and the fourth engaging portions 24 are not limited in the present invention. Additionally, although in the embodiment the third engaging portion 14 is a square hole and the fourth engaging portions 24 is correspondingly a square pillar, forming as a simple engagement, the specific engaging shapes of the third engaging portions 14 and the fourth engaging portions 24 are not limited in the present invention, so that any shape or structure which can only engage with each other and can easily be separated can be adopted.

Figure 7:
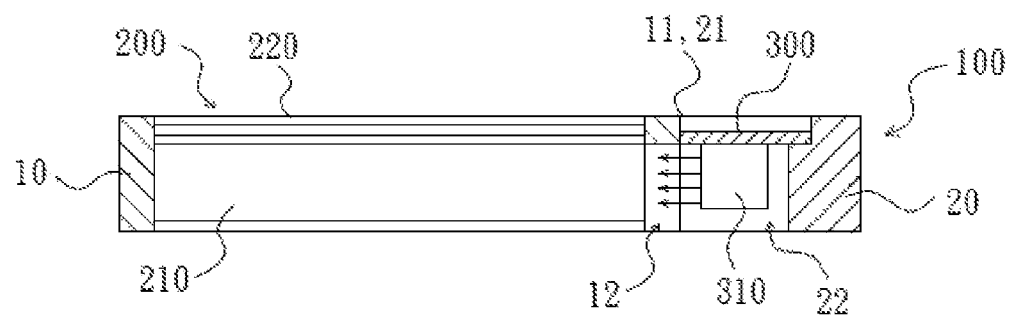
FIG. 7 is a cross-sectional view of FIG. 3 along a C-C sectional diction, and shows the plastic frame body and the light source carrier of the present invention after being assembled.

Refer now to FIGS. 3, 4, and 7, wherein FIG. 7 is a cross-sectional view of FIG. 3 along a C-C sectional diction, and shows the plastic frame body and the light source carrier of the present invention after being assembled. The present invention provides a backlight module, which comprises: a plastic frame structure 100, a light guide plate element 200, and a light source circuit board 300. The plastic frame structure 100 mainly comprises: a plastic frame body 10 and a light source carrier 20. The plastic frame body 10 is a rectangular hollow frame having four side edges, wherein at least one of the four side edges thereof is a light source side edge 11, and a plurality of light source openings 12 are formed along a length direction of the light source side edge 11. Additionally, an assembling side edge 21 of the light source carrier 20 is correspondingly assembled on the light source side edge 11 of the plastic frame body 10, and a plurality of light source receiving grooves 22 are formed corresponding to the light source openings 12. Furthermore, the plastic frame body 10 and the light source carrier 20 are respectively provided with the first engaging portions 13 and the second engaging portions 23 in the above-mentioned embodiment, and further have the third engaging portions 14 and the fourth engaging portions 24, so as to form a frame structure 100 of a detachable-type design, which is convenient to be disassembled and assembled.

As shown in FIG. 7, the light guide plate element 200 at least comprises a light guide plate 210 and an optical film assembly 220. The light guide plate 210 is installed into the plastic frame body 10 of the plastic frame structure 100, and the optical film assembly 220 is installed on the light guide plate 210. The light source circuit board 300 comprises a plurality of light sources 310. The light source circuit board 300 is reversely adhered on an upper surface of the light source carrier 20, so that the plurality of light sources 310 of the light source circuit board 300 are respectively placed into the plurality of light source receiving grooves 22, and the plurality of light sources 310 of the light source circuit board 300 emit lights toward the center of the plastic frame structure 100 through the plurality of light source openings 12, namely emit lights toward the light guide plate 210.

As shown in FIG. 7, the light source circuit board 300 is reversely adhered on the upper surface of the light source carrier 20, so that the plurality of light sources 310 are respectively placed into the plurality of light source receiving grooves 22. However, in other possible embodiments of the present invention, the light source circuit board 300 can be assembled onto or into the light source carrier 20 by other means as long as the plurality of light sources 310 thereof can respectively correspond to the light source receiving grooves 22 of the light source carrier 20.

As shown in FIG. 7, the plastic frame structure 100 of the present invention mainly comprises a plastic frame body 10 and a light source carrier 20. Because the plastic frame body 10 and the light source carrier 20 are a detachable-type design, when in assembling, the plastic frame body 10, the light guide plate 210, and the optical film assembly 220 are formed as a first assembling body; and can process a functional test to the light guide plate alone; and the light source carrier 20 and the light source circuit board 300 are formed as a second assembling body, and can process a functional test to the light sources alone; and after the two assembling bodies are assembled by their respective engaging elements, that are formed as a complete backlight module, so as to execute a functional test on the whole of the backlight module.

As mention above, in the present invention, the plastic frame structure 100 is separated into two parts, mainly the plastic frame body 10 and the light source carrier 20, wherein the plastic frame body 10 is used to carry the light guide plate and so on, and the light source carrier 20 is used to fix light sources. The two parts are connected with a detachable means, so as to be conveniently tested respectively, and then assembled together when no defect is found, as so to increase the assembling efficiency. Furthermore, if the two parts are assembled but have defects found, they can conveniently be changed, respectively. Therefore, not only the rework cost can be reduced, but also efficiencies of the test and assembly for the whole of the backlight module are increased.

The present invention has been described with preferred embodiments thereof and it is understood that many changes and modifications to the described embodiment can be carried out without departing from the scope and the spirit of the invention that is intended to be limited only by the appended claims.

The invention claimed is:

1. A plastic frame structure of a backlight module, comprising:
   a plastic frame body being a rectangular hollow frame and having at least one light source side edge, wherein a plurality of light source openings are formed along a length direction of the light source side edge; and
   at least one light source carrier having an assembling side edge correspondingly assembled onto the light source side edge of the plastic frame body, wherein a plurality of light source receiving grooves are formed corresponding to the light source openings; a light source circuit board is installed on the light source carrier; and a plurality of light sources of the light source circuit board are respectively placed into the light source receiving grooves, and emit lights toward an inside of the plastic frame structure through the light source openings;
   wherein the assembling side edge is correspondingly assembled onto the light source side edge of the plastic frame body by way of engagement; and the light source circuit board is reversely adhered on an upper surface of the light source carrier, so that the light sources are respectively placed into the light source receiving grooves of the light source carrier.

2. The plastic frame structure of the backlight module according to claim 1, wherein two ends of the light source side edge of the plastic frame body are respectively provided with a first engaging portion; two ends of the assembling side edge of the light source carrier are respectively and correspondingly provided with a second engaging portion; and the first engaging portion is engaged with the second engaging portion.

3. The plastic frame structure of the backlight module according to claim 2, wherein a central portion of the light source side edge of the plastic frame body is provided with a third engaging portion; a central portion of the assembling side edge of the light source carrier is correspondingly provided with a fourth engaging portion; and the third engaging portion is engaged with the fourth engaging portion.

4. A plastic frame structure of a backlight module, comprising:
   a plastic frame body being a rectangular hollow frame and having at least one light source side edge, wherein a plurality of light source openings are formed along a length direction of the light source side edge; and
   at least one light source carrier having an assembling side edge correspondingly assembled onto the light source side edge of the plastic frame body, wherein a plurality of light source receiving grooves are formed corresponding to the light source openings; a light source circuit board is installed on the light source carrier; and a plurality of light sources of the light source circuit board are respectively placed into the light source receiving grooves, and emit lights toward an inside of the plastic frame structure through the light source openings.

5. The plastic frame structure of the backlight module according to claim 4, wherein the assembling side edge is correspondingly assembled onto the light source side edge of the plastic frame body by way of engagement.

6. The plastic frame structure of the backlight module according to claim 5, wherein two ends of the light source side edge of the plastic frame body are respectively provided with a first engaging portion; two ends of the assembling side edge of the light source carrier are respectively and correspondingly provided with a second engaging portion; and the first engaging portion is engaged with the second engaging portion.

7. The plastic frame structure of the backlight module according to claim 6, wherein a central portion of the light source side edge of the plastic frame body is provided with a third engaging portion; a central portion of the assembling side edge of the light source carrier is correspondingly provided with a fourth engaging portion; and the third engaging portion is engaged with the fourth engaging portion.

8. The plastic frame structure of the backlight module according to claim 4, wherein the light source circuit board is reversely adhered on an upper surface of the light source carrier, so that the light sources are respectively placed into the light source receiving grooves of the light source carrier.

9. A backlight module, comprising:
   a plastic frame structure, comprising:
      a plastic frame body being a rectangular hollow frame and having at least one light source side edge, wherein a plurality of light source openings are formed along a length direction of the light source side edge; and at least one light source carrier having an assembling side edge correspondingly assembled onto the light source side edge of the plastic frame body, wherein a plurality of light source receiving grooves are formed corresponding to the light source openings;

a light guide plate installed into the plastic frame body;

an optical film assembly installed on the light guide plate; and a light source circuit board having a plurality of light sources and installed on the light source carrier, wherein the light sources are respectively placed into the light source receiving grooves of the light source carrier, and emit lights toward the light guide plate inside the plastic frame body through the light source openings;

wherein the plastic frame body, the light guide plate, and the optical film assembly are commonly formed as a first assembling body; the light source carrier and the light source circuit board are commonly formed as a second assembling body; and the first assembling body and the second assembling body are detachably assembled with each other.

10. The backlight module according to claim 9, wherein the assembling side edge is correspondingly assembled onto the light source side edge of the plastic frame body by way of engagement.

11. The backlight module according to claim 10, wherein two ends of the light source side edge of the plastic frame body are respectively provided with a first engaging portion; two ends of the assembling side edge of the light source carrier are respectively and correspondingly provided with a second engaging portion; and the first engaging portion is engaged with the second engaging portion.

12. The backlight module according to claim 11, wherein a central portion of the light source side edge of the plastic frame body is provided with a third engaging portion; a central portion of the assembling side edge of the light source carrier is correspondingly provided with a fourth engaging portion; and the third engaging portion is engaged with the fourth engaging portion.

13. The backlight module according to claim 9, wherein the light source circuit board is reversely adhered on an upper surface of the light source carrier, so that the light sources are respectively placed into the light source receiving grooves of the light source carrier.

\* \* \* \* \*